March 15, 1955  F. H. MUELLER  2,704,104
PIPE EXPANDING TOOL
Filed Dec. 9, 1949  7 Sheets-Sheet 1
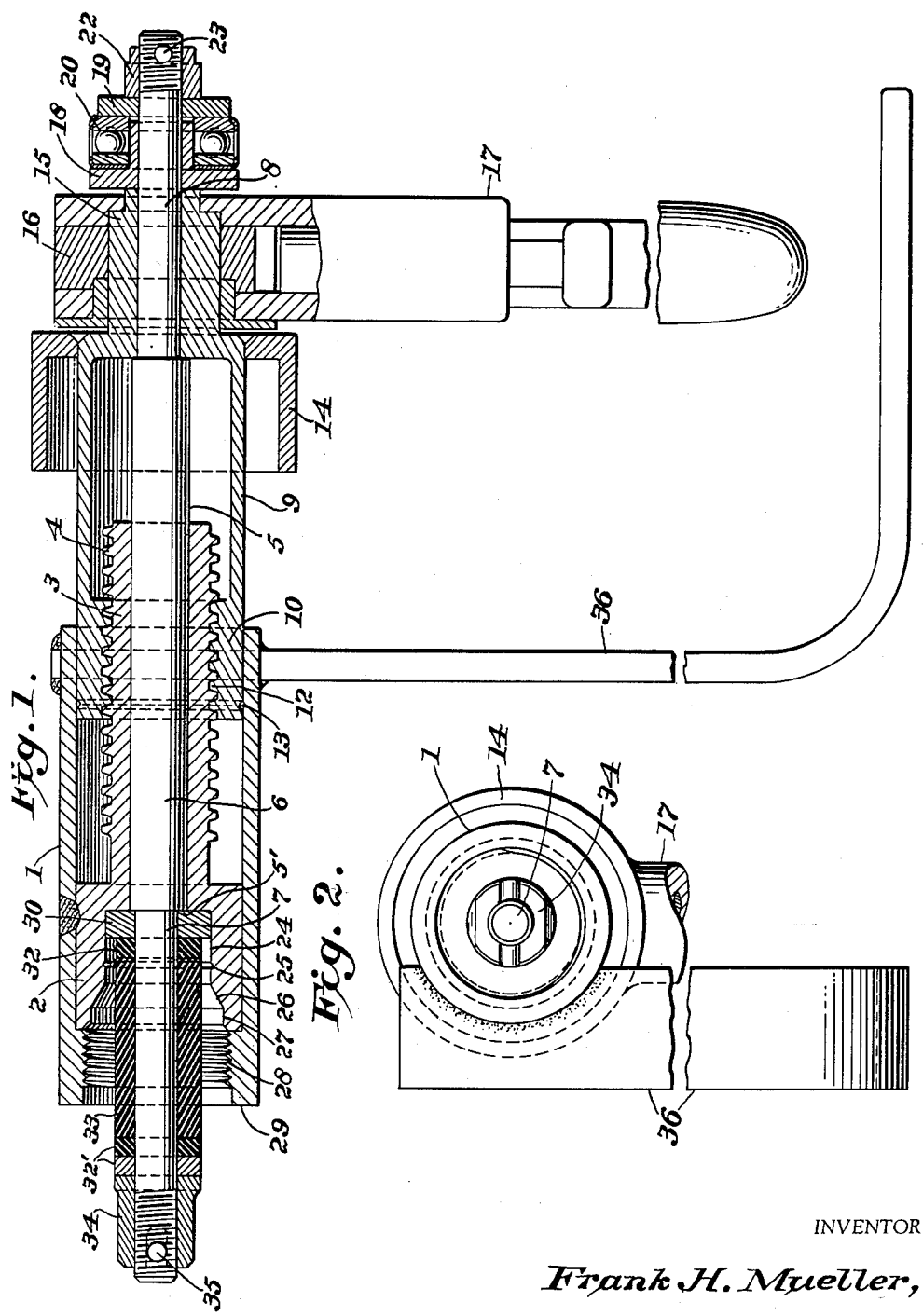
INVENTOR:
Frank H. Mueller,
BY Cushman, Darby & Cushman
ATTORNEYS.

March 15, 1955  F. H. MUELLER  2,704,104
PIPE EXPANDING TOOL
Filed Dec. 9, 1949  7 Sheets-Sheet 2
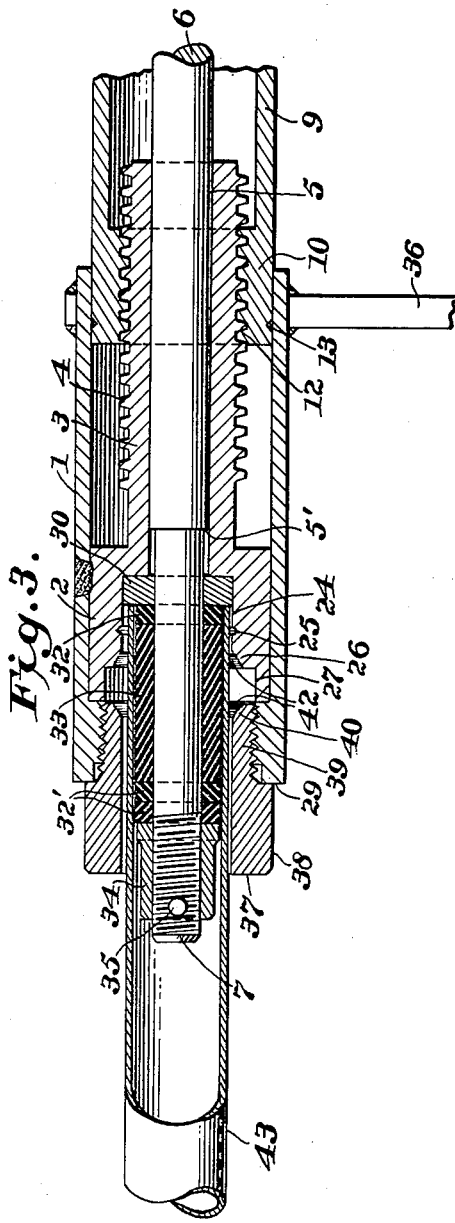
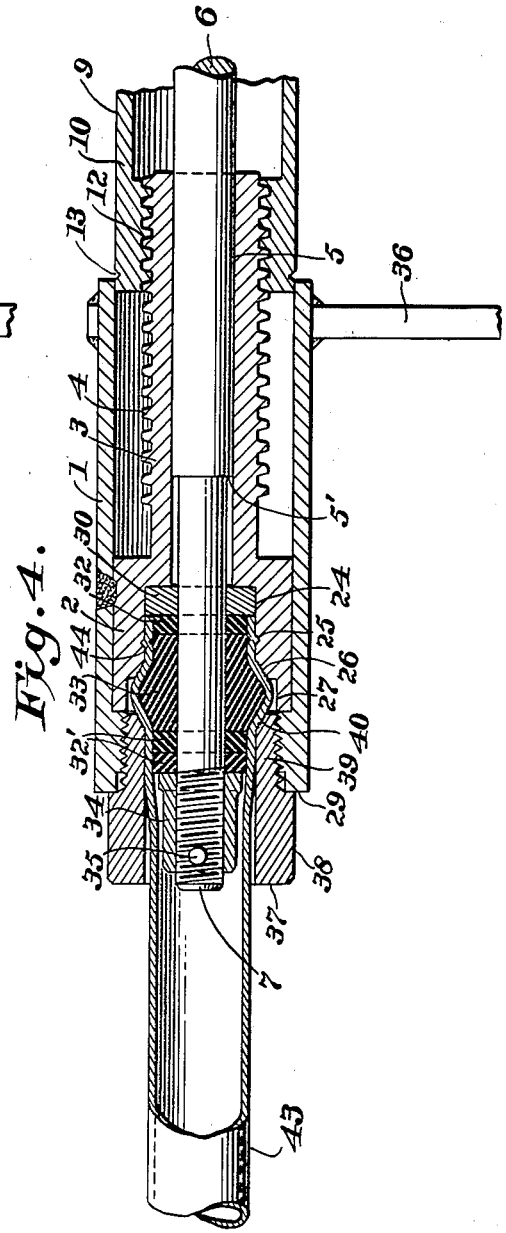
INVENTOR:
Frank H. Mueller,
BY Cushman, Darby & Cushman
ATTORNEYS.

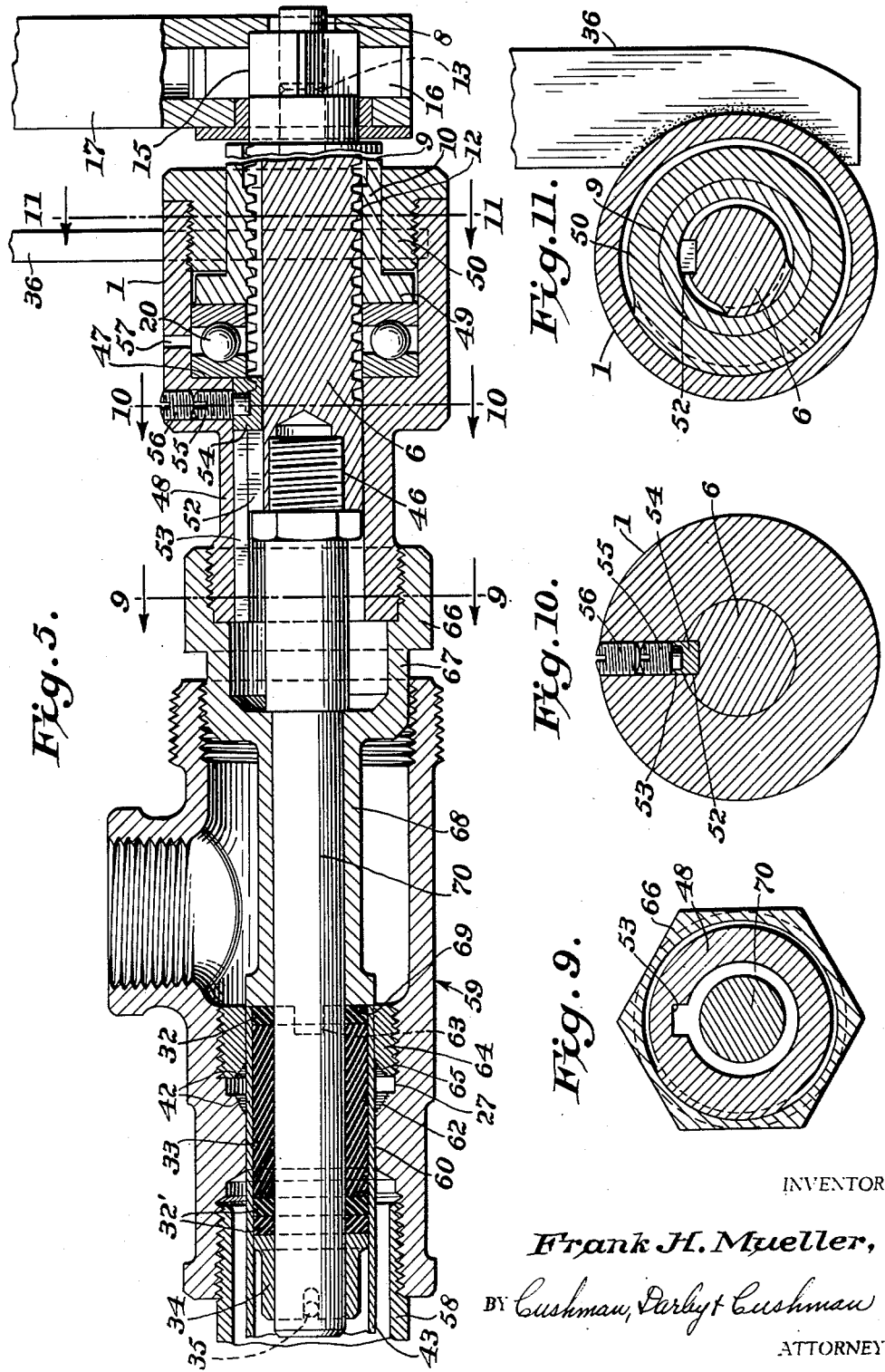

March 15, 1955
F. H. MUELLER
2,704,104
PIPE EXPANDING TOOL
Filed Dec. 9, 1949
7 Sheets-Sheet 4
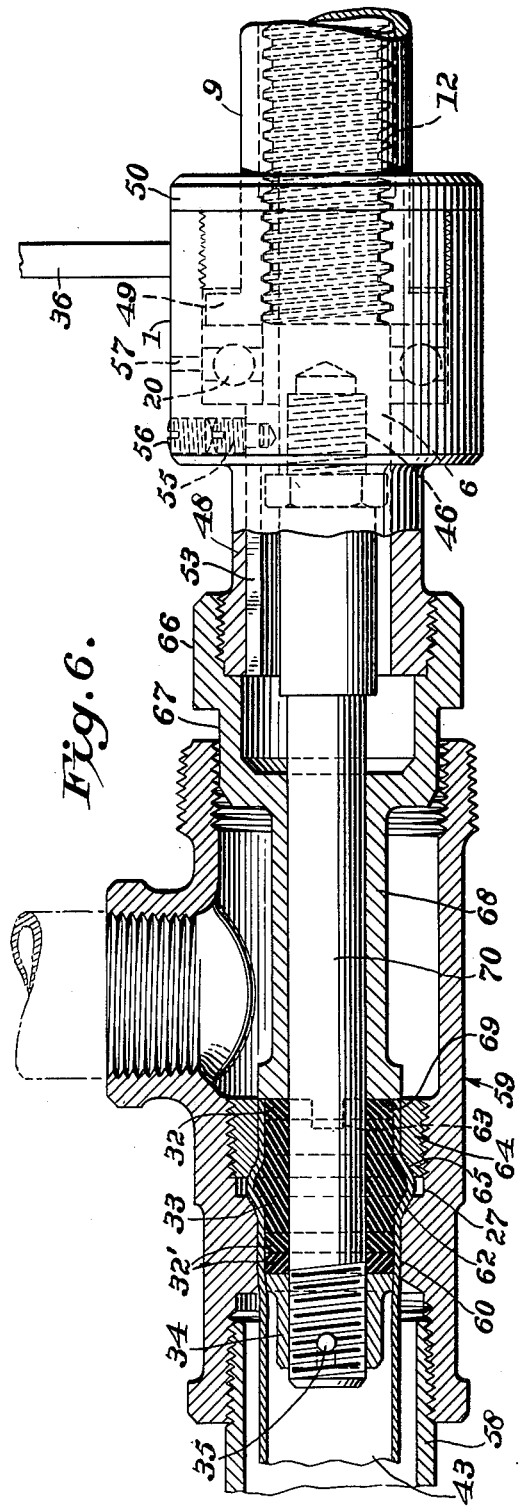
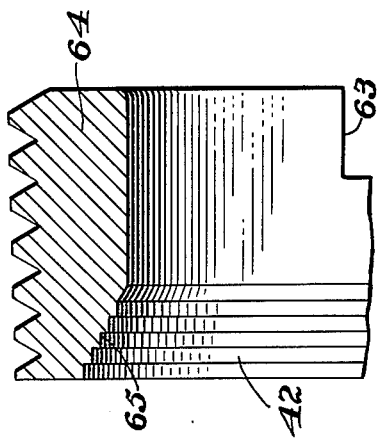
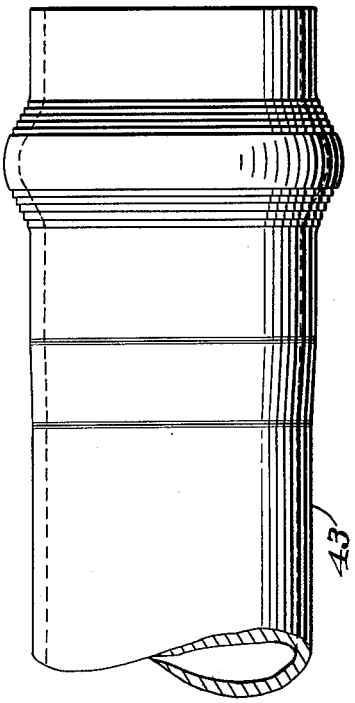
INVENTOR:
*Frank H. Mueller,*
BY *Cushman, Darby & Cushman*
ATTORNEYS.

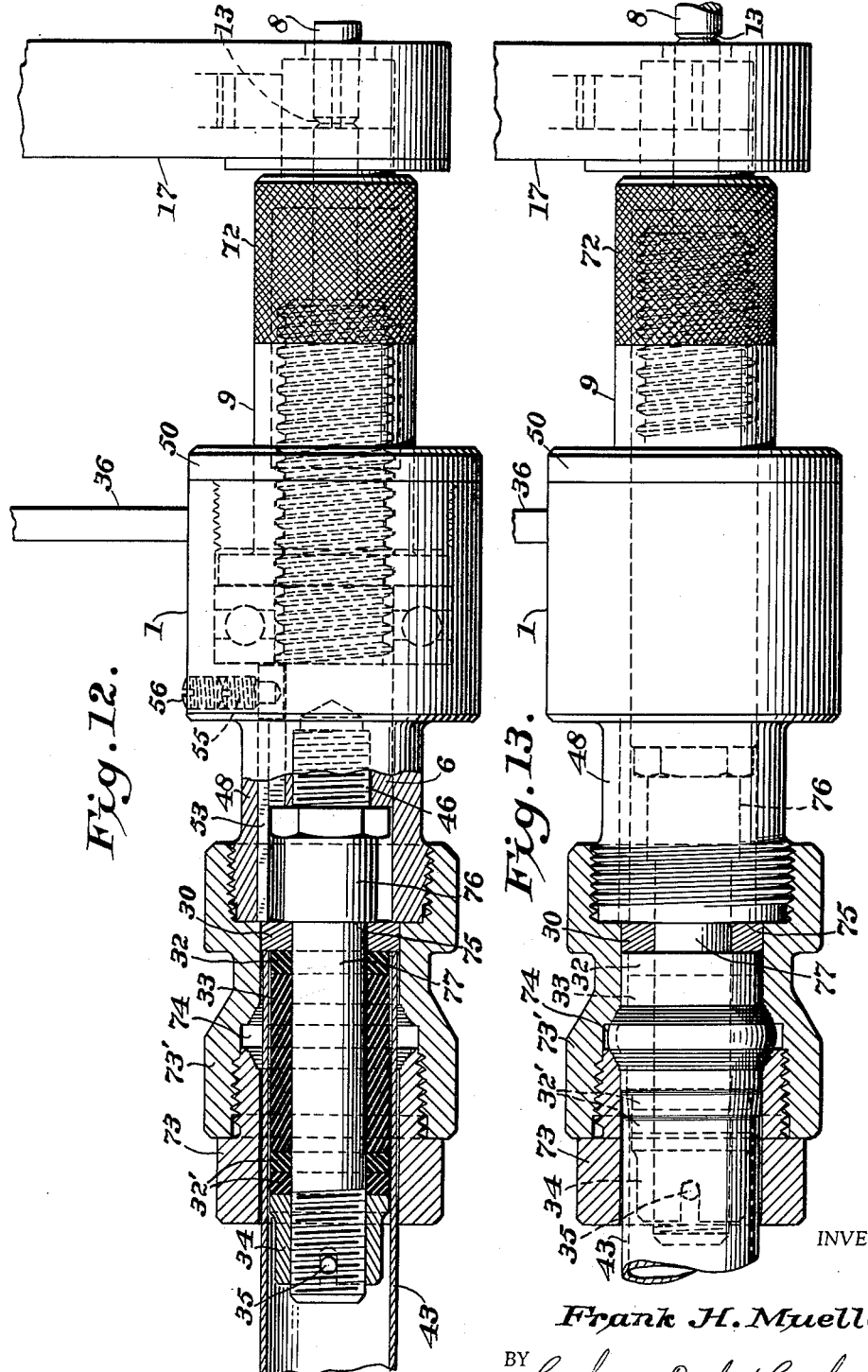

March 15, 1955
F. H. MUELLER
2,704,104
PIPE EXPANDING TOOL
Filed Dec. 9, 1949
7 Sheets-Sheet 6
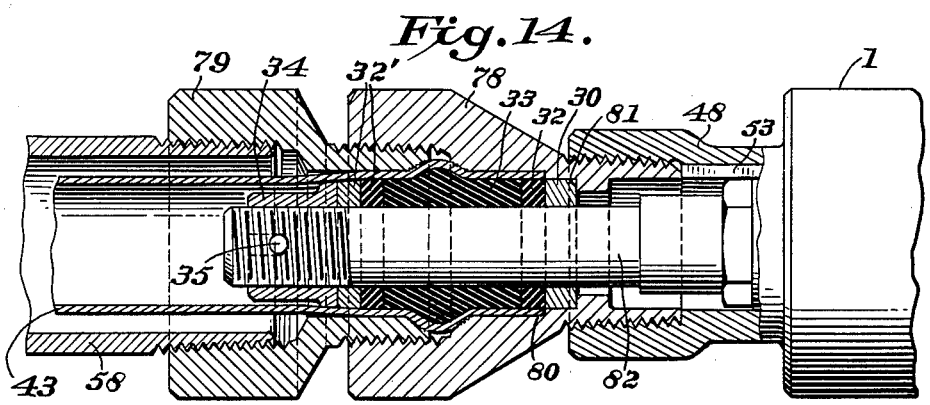
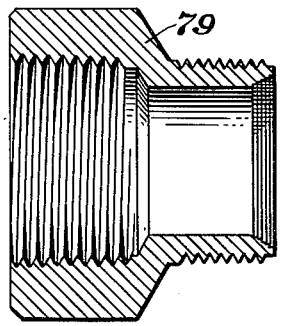
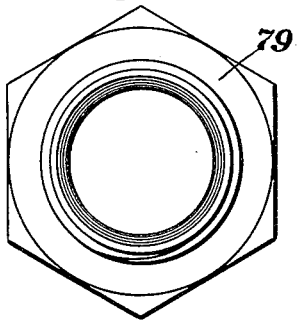
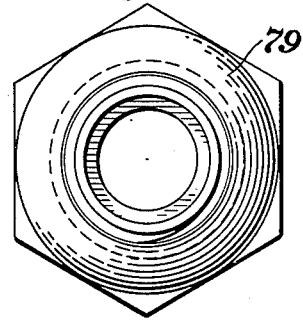
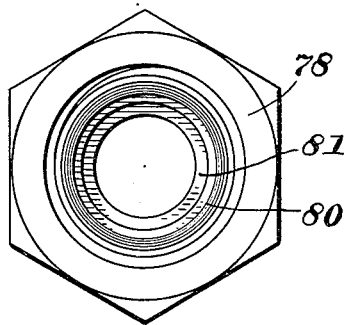
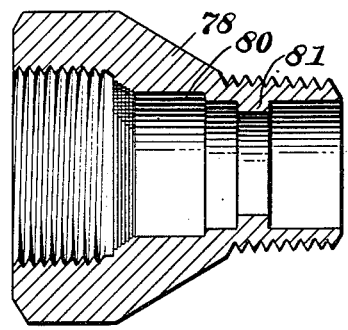
INVENTOR:
*Frank H. Mueller,*
BY *Cushman, Darby & Cushman*
ATTORNEYS.

March 15, 1955 F. H. MUELLER 2,704,104
PIPE EXPANDING TOOL
Filed Dec. 9, 1949 7 Sheets-Sheet 7

INVENTOR:
Frank H. Mueller,
BY Cushman, Darby & Cushman
ATTORNEYS.

United States Patent Office 2,704,104
Patented Mar. 15, 1955

2,704,104

PIPE EXPANDING TOOL

Frank H. Mueller, Decatur, Ill., assignor to Mueller Co., Decatur, Ill., a corporation of Illinois Application December 9, 1949, Serial No. 131,995

6 Claims. (Cl. 153—73)

This invention relates to pipe expanding tools, particularly to devices adapted to bead, flare or otherwise expand the end portions of ductile pipes or tubes, such as smooth walled copper tubes, to adapt the end portions for coupling joints and the like.

It is an object of the present invention to provide a simplified, hand operable pipe expanding tool, readily portable and adapted for on-the-job use.

It is a further object of the present invention to provide a pipe expanding tool adaptable for operation on pipes of varying diameter and wall thickness, in conjunction with a variety of auxiliary devices, and under all working conditions normally encountered in practice.

A further object of the invention is to provide a pipe expanding tool comprising an integral die or forming section, wherein pipe ends may be uniformly expanded into the exact shape and size desired.

Another object is to provide a pipe expanding tool integrally including an outwardly flaring, annularly serrated bead forming die surface.

A further object is to provide a pipe expanding tool inherently operative to expand pipe ends to desired size and shape without thinning or otherwise weakening the pipe wall.

Still another object is to provide a pipe expanding tool comprising built-in indicator means, whereby the end of the expanding operation may be readily and accurately ascertained. Further objects will be in part obvious and in part pointed out hereinafter.

The invention and the novel features thereof may best be made clear from the following description and the accompanying drawings, in which:

Figure 1 is a longitudinal sectional view of a preferred embodiment of the present invention, adapted for beading ductile metal tubing;

Figure 2 is an end elevational view of the device of Figure 1;

Figures 3 and 4 are views corresponding to Figure 1, showing progressive stages of the operation thereof;

Figure 5 is a longitudinal sectional view of a further embodiment of the invention, adapted for operation in conjunction with a variety of interchangeable auxiliary devices, and arranged as shown for beading a copper replacement tube inside a special T fitting extending from a discontinued service pipe;

Figure 6 is a view corresponding to Figure 5, but showing the position of the parts thereof at the end of the beading operation;

Figure 7 is an enlarged elevational view of the beaded pipe end formed by the arrangement of Figures 5 and 6;

Figure 8 is an enlarged sectional view of the die spud employed in the T fitting of Figures 5 and 6, showing the annular serrations thereof;

Figure 9 is a section taken on the line 9—9 of Figure 5;

Figure 10 is a section taken on the line 10—10 of Figure 5;

Figure 11 is a section taken on the line 11—11 of Figure 5;

Figure 12 is an elevational view, partly in section, of the tool of Figure 5 arranged to bead a pipe within another type of coupling fitting structure;

Figure 13 is a view corresponding to Figure 12, showing the position of the various parts at the end of the beading operation;

Figure 14 is a longitudinal sectional view of the tool of Figure 5 arranged to bead a replacement tube within still another type of coupling fitting structure;

Figure 15 is a sectional view of the male coupling fitting employed in Figure 14;

Figures 16 and 17 are end elevational views of the fitting of Figure 15;

Figure 18 is an end elevational view of the female coupling fitting employed in Figure 14;

Figure 19 is a sectional view of the fitting of Figure 18;

Figure 20:
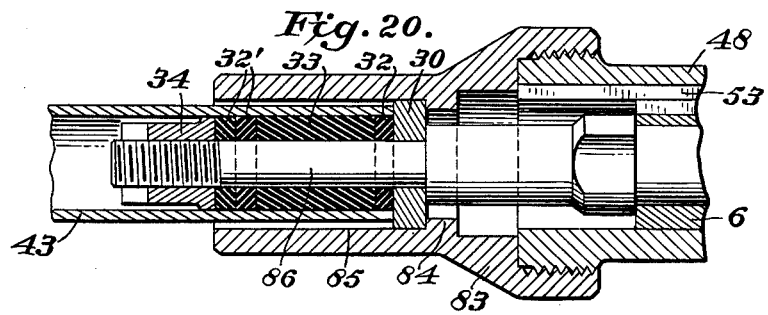
Figure 20 is a longitudinal sectional view of the inner end of the tool of Figure 5, modified and adapted for expanding a tube end into socket form for a solder joint.

Referring to the drawings, in Figure 1 is shown a preferred embodiment of the invention, comprising a sleeve member 1, having permanently affixed thereto or integrally incorporated therewith the die section indicated generally as 2. A reduced portion 3, provided with external threads 4, extends outwardly from the die section. Shaft 5 is disposed within the sleeve, the central section 6 thereof fitting closely within the reduced sleeve portion 3, and the reduced inner end 7 and outer end 8 thereof extending on either side of the sleeve.

Also enclosing shaft 5 is the collar member 9, the enlarged inner end portion 10 of which is provided with internal threads 12 and the external indicator groove 13. As shown, the collar member is telescopically received between the reduced portion 3 and the outer section of the sleeve member, and threadably engaged by threads 12 to the threads 4 of the sleeve reduced portion 3. Outwardly, collar 9 comprises a cap member 14 welded or otherwise suitably affixed thereto, the cap member being adapted externally as a wrench-hold or hand-hold. Outwardly of the cap member, the collar member is formed into reduced section 15, preferably of rectangular cross section, upon which a conventional two-way ratchet wheel 16 is suitably mounted, operable in the ordinary manner by the pawl handle indicated generally as 17. Outwardly of collar section 15, a bushing 18 and washer 19 are positioned on the outer shaft end 8, spaced by and retaining therebetween an anti-friction bearing 20. Nut 22 is threadably engaged to the outer end of the shaft and locked in place as by pin 23, the nut serving to retain the bushing, bearing and washer assembly.

The sleeve member die section 2 comprises a central bore 24, the bore being provided in the exemplary embodiment with an annular groove 25 adjacent its inner end, and merging finally into the outwardly flaring conical surface 26, which terminates in recess 27. Inwardly of the recess, the sleeve member is provided with internal threads 28, extending substantially to the end stop surface 29 thereof.

Mounted on the inner end 7 of shaft 5 within the die section bore 24 is a stop washer 30, fitting closely between the shaft inner end and the bore. Inwardly of the stop washer, there are successively positioned on the shaft end a hard rubber washer 32, a resilient sleeve 33, hard rubber washers 32', and the nut 34. Nut 34 is threadably engaged to the inner end of the shaft, desirably positioned to exert a slight retaining pressure on the washers and resilient sleeve, and locked in such position as by pin 35. A handle 36 is fixedly secured to the exterior of sleeve 1 and extends outwardly therefrom.

The operation of the device of Figures 1 and 2 is sequentially illustrated in Figures 3 and 4. The die section 2 of the sleeve member, it will be understood, only partially defines a bead forming cavity, and is used in conjunction with a complementary die member to completely define such a cavity. In Figures 3 and 4, spud 37 constitutes an exemplary complementary die member, the spud comprising an enlarged wrench-hold 38 and the reduced end portion 39 extending therefrom, the end portion being externally threaded and formed internally into the outwardly flaring conical surface 40. Surface 40 is positioned and disposed to align with and face surface 26 of the sleeve die section, when the spud is engaged to the threads 28 thereof, as shown. The spud end portion 39 is of proper length to correctly space surface 40 relative to surface 26, when the edge of spud wrench-hold 38 is brought into abutment with the sleeve member stop surface 29. For reasons presently apparent, the surfaces 26 and 40 may optionally be formed into a plurality of annular serrations 42.

In preparation for the expanding operation, the spud may be threaded into engagement with the tool sleeve member, and the assembled mechanism passed over the end of a pipe to be expanded, such as copper tube 43, as shown in Figure 3. The end of the tube enters the expanding tool until finally positioned against stop washer 30. Alternatively, the spud may first be placed on the copper tube, the expanding tool may then be telescopically positioned about the end of the tube, and the spud finally threaded into engagement with the tool.

Pawl handle 17 is then manipulated so as to rotate collar member 9 relative to the sleeve member in the proper direction to effect outward movement of the collar member relative to the sleeve, the latter being restrained from rotation meanwhile by means of handle 36 affixed thereto. It will be evident that as the collar member traverses outwardly, shaft 5 is similarly displaced outwardly relative to the sleeve member, the axial movement of the collar member being transmitted to the shaft through bearing 20, whereby the shaft is displaced without corresponding rotation. As the shaft is displaced relative to the sleeve and stop washer 30 bearing thereagainst, the washers 32 and 32' and resilient sleeve 33 are compressed between nut 34 and the stop washer, whereby they are caused to expand outwardly against the wall of tube 43. As the expansion proceeds, the expanding elements exert tremendous force against the tube, expanding it outwardly into close-fitting relationship with the bores of the spud 37 and die section 2, and into bead form within the cavity defined by surfaces 26 and 40. Rotation of collar 9 is continued until indicator groove 13 is exposed at the outer edge of sleeve 1, the groove being positioned to accurately indicate the end of the expanding operation. The relationship of the various elements at the end of the expanding operation is shown in Figure 4. It will be noted that the expanding elements have an original undistorted length considerably exceeding the length of the bead-forming cavity and extending on both sides thereof, whereby in the expansion these elements expand the tube wall for a substantial distance on either side of the bead, as shown.

The recess 27 of the die member is desirably of sufficient diameter so as not to restrict the bead formed between surfaces 26 and 40, whereby the central portion of the bead is permitted to assume a naturally rounded form. During the bead formation, the bead sides are forced into interfitting relationship with the serrations 42 of the conical surfaces.

When the expanding operation has been completed, the collar member may be rotated in the opposite direction by means of either pawl handle 17 or the cap member 14, to displace the shaft and shaft end 7 relatively to the left as shown, permitting the expanding elements to return to their undistorted shape shown in Figure 3. The spud 37 may then be unscrewed from the tool. The copper tube having been tightly expanded into contact with a portion of the spud bore, unscrewing of the spud may tend to turn and twist the tube. Primarily to resist this tendency, a small annular bead 44 is formed within groove 25 of the sleeve die section during the expanding operation, providing increased frictional resistance between the expanded tube and the die section, whereby the tube will be restrained from rotation while the spud is loosened and removed. When later used again, the spud will fit very closely over the expanded portion of the tube, but will turn freely thereon without binding. The small bead 44 may be readily removed from the tube by drawing or shearing as the tube is forcibly removed from the die section. This may conveniently be accomplished by rotating the collar member to displace the shaft and shaft end 7 further to the left, until the shaft shoulder 5' at the inner end of shaft end 7 encounters stop washer 30 and through it forces the tube end out of the die section. The end of the tube is accurately sized and smoothed, it will be apparent, as it emerges from the die section.

The appearance of the beaded tube end is clearly shown in Figure 7, wherein it will be seen that the sloping side portions of the tube bead are formed into exactly interfitting relationship with the serrated surfaces of the bead forming die elements. The spud 37 employed in the expanding operation, it will be recognized, is ideally adapted for employment as one of the final coupling fittings to be used in making a coupling joint on the tube bead, and is retained on the tube. Another coupling fitting, internally formed to correspond substantially to the tool die section, may subsequently be positioned about the end of the tube and threadably engaged to the spud. The coupling fittings being so aligned, the serrated conical surfaces thereof will engage and interfit with the correspondingly formed side portions of the tube bead, and as the coupling is tightened the effect will be to compress the bead without slippage, whereby a self-locking joint is effected and maintained by the functioning of the tube bead acting as a U-shaped spring. The tube end having been expanded on both sides of the bead, it will fit closely within the bores of the coupling members, whereby rocking or vibrational movements of the tube external of the coupling will be transmitted directly to the coupling fittings through the bore walls thereof, and will not be effective to disturb the bead joint. The diameter of bore 24 of the tool die section may be very slightly smaller than the bore diameter of spud 37, so that the outer end portion of the tube will fit readily within a fitting having the same bore diameter as does spud 37.

Hard rubber washers 32 and 32' assist in expanding the tube, but function primarily to seal off the softer rubber of sleeve 33 under compression, and prevent escape of the softer rubber between the hard rubber washers and the tube. The beaded tube joint formed as described is outstandingly effective, being entirely proof against leakage caused by high pressures, vibrational disturbances, or forces tending to pull the tube out of the coupling. The interfitted serrations in both the coupling inclined surfaces and the bead side portions resist forces tending to pull the tube out of the coupling so effectively that the tube will fail outside the coupling before the joint is broken. Additionally, each serration of the inclined surfaces of the coupling fittings acts as a distinct metal-to-metal knife-edge seal to the tube, the side portions of the tube bead automatically aligning with the serrated surfaces of the coupling fittings as the latter are tightened, whereby a highly effective multiple seal is attained. The tube portions on either side of the bead being expanded into perfect external round, in conformity with the bores in which they are expanded, they will fit readily within a bore of almost exactly the same diameter, the tight fit being obtained regardless of original out of round of the tube or angular variations in tube wall thickness. Additionally, the tube portions expanded into perfect external round are perfectly adapted for use of the well known O-ring type seals therewith. O-rings, which require a perfect surface for ideal functioning, may be incorporated into one or both of the fittings employed in the final coupling, as will be readily understood. In the formation of the bead, the expanding resilient sleeve 33 frictionally engages the enclosing tube wall, and draws the tube inwardly toward the expanding tool into the bead forming cavity as the expansion proceeds, whereby the tube wall is neither thinned nor otherwise weakened by the expanding operation.

A further embodiment of the invention is shown in Figures 5 and 6, constructed and adapted to expand pipes of various diameters under different conditions of work, primarily by provision for utilization therewith of interchangeable adapters and shaft extensions. In the modification of Figure 5, wherein the same numerals are used to identify corresponding elements, central section 6 of shaft 5 is externally threaded, and terminates at its inner end in an internally threaded socket 46, rather than in the inner end portion 7 of the embodiment previously described. Approximately midway of its length, sleeve member 1 is formed into an internal shoulder 47, and inwardly thereof into a reduced neck portion 48 which is externally threaded at its inner end. As before, collar member 9 is partially enclosed within the sleeve member, but is fixed relatively thereto in the axial direction by the annular flange 49 extending outwardly from its inner end, said flange being retained within the sleeve by the retainer ring 50 threaded into the outer end of the sleeve.

In this embodiment, anti-friction bearing 20 is disposed between the collar flange 49 and sleeve shoulder 47, and the collar is threadably engaged to the shaft rather than to the sleeve member, as shown. It will be readily recognized that rotation of the collar relative to the sleeve member and shaft will be effective, as before, to cause axial traverse of the shaft relative to the sleeve member. To positively insure against rotation of the shaft member with the collar, the shaft in this modification is provided with a longitudinal slot 52, and the sleeve neck portion with a corresponding slot 53, the slots being aligned and maintained in alignment by means of key 54. Key 54 is maintained in desired position by set screw 55, which in turn is locked in place by a locking screw 56. A lubrication hole 57 may be provided in the sleeve member for lubrication of bearing 20.

It will be evident that axial traverse of the shaft relative to the sleeve member may be effected as before by rotation of the collar by means of pawl handle 17, while restraining the sleeve and shaft from rotation by means of handle 36. In this embodiment the indicator groove 13 may conveniently be incorporated into the outer end portion 8 of the shaft, as shown in Figure 5.

In Figures 5 and 6 the device is shown in expanding relationship with a copper tube positioned for employment as a replacement tube in connection with a discontinued service pipe. As is well known in the art, ferrous metal service pipes for the delivery of gas and water frequently corrode until no longer serviceable, and are commonly replaced by copper tubes of smaller diameter inserted therewithin and connected at one end to the service main and on the premises of the consumer to suitable fittings. As shown in Figure 5, a copper tube 43 is positioned within a discontinued service pipe 58, and extends therefrom. Threadably engaged to the discontinued service pipe is a special T fitting designated generally as 59, the T fitting comprising a restricted longitudinal bore portion 60 terminating at one end in the outwardly flaring serrated bead forming surface 62. Threadably engaged into the T, as by means of the tool slots 63, is a coupling spud 64, provided with a serrated conical surface 65 disposed opposite surface 62 and properly spaced therefrom to constitute therewith and with the T recess 27 a bead forming cavity.

Threaded to neck portion 48 of the tool sleeve member is an adapter 66, necked down as at 67 for reception within the T, and necked down further into the portion 68, which terminates in stop surface 69. The stop surface is desirably of somewhat larger outer diameter than is the tube 43. Positioned within the adapter, fitting closely within neck portion 68 and threadably engaged to socket 46 of shaft 5, is the shaft extension 70, bearing inwardly of the adapter neck portion hard rubber washer 32, resilient sleeve 33, hard rubber washers 32', and the nut 34, engaged to and fixed to the end of the shaft extension.

The copper tube being arranged to protrude the correct distance from pipe 58, the T may be threaded onto the pipe with coupling spud 64 already properly positioned therein. The tool, provided with the shaft extension and adapter as shown, may then be inserted into the T and tube until stop surface 69 of the adapter encounters the end of the copper tube, whereby the expanding elements on the shaft extension are properly positioned to expand the tube end and form a bead therein.

As in the case of the preceding embodiment, the expansion is effected by rotation of pawl handle 17 in the proper direction, while restraining the sleeve member from rotation by means of handle 36. The resulting axial movement of the shaft and shaft extension to the right as shown, relative to the sleeve member and adapter, compresses the expansion elements between nut 34 and stop surface 69, whereby the tube is expanded and beaded as previously described. Emergence of indicator groove 13 from the pawl handle, in this case, provides a convenient indication of the end of the expansion operation. The position of the various elements at the end of the expansion stroke is shown in Figure 6.

The collar member may now be rotated in the opposite direction by means of pawl handle 17, or more conveniently by means of the collar member knurled portion 72 (see Figure 12), and the shaft and shaft extension thereby returned to their original position, shown in Figure 5. The expanding tool may thereupon be removed from the tube and T, and the coupling spud 64 tightened down onto the tube bead by means of a special tool operative on slots 63 of the spud, whereby a fluid-tight, vibration-proof joint between the tube and T is effected.

A further example of utilization of the versatile tool of Figures 5 and 6 is illustrated in Figures 12 and 13, wherein the same tool is employed to expand and bead a copper tube within a pair of coupling fittings 73 and 73'. As shown in Figure 12, the fittings when threadably engaged define aligned bores and a bead forming cavity 74 therebetween of the type previously described. In this example, fitting 73' is threaded directly onto the inner end of the sleeve member neck portion 48. A modified shaft extension 75 is engaged to socket 46 of shaft 5, the shaft extension comprising a boss 76 and inwardly thereof the reduced end portion 77. End portion 77 supports the stop washer 30, fitting closely within the bore of fitting 73' and bearing against the inner end of sleeve member neck portion 48, which in this case functions as a stop surface. Adjacent the stop washer, the shaft extension bears successively the hard rubber washer 32, resilient sleeve 33, hard rubber washers 32', and nut 34, previously described.

It will be evident that in this application no sleeve member adapter is required, the fitting 73' serving as such. The shaft extension and fittings are properly dimensioned so that when assembled as shown, and positioned about the tube with the tube end abutting the stop washer, the expanding elements and bead forming cavity are properly positioned relative to each other and to the tube end for the expanding operation. The tube expansion is carried out as in the previous example, the position of the elements at the end of the expansion stroke being shown in Figure 13. After the expansion, when the expanding elements have been returned to their original undistorted shape, the tool may be disengaged merely by unscrewing from fitting 73', leaving the fittings 73 and 73' engaged on the bead for employment as final coupling fittings.

Another mode of employment of the tool of Figures 5 and 6 is illustrated in Figure 14, wherein the neck portion of the tool sleeve member is internally threaded, and a modified adapter 78 is engaged thereto. The adapter is coupled to a fitting 79, and together with it defines an internal bead forming cavity, as in the foregoing embodiments. Fitting 79 in this application extends from a discontinued service pipe 58, from which a replacement copper service tube protrudes as already described. Adapter 78 comprises an internal shoulder 80 and adjacent thereto an internal flange 81, designed to function as stops for the end of the tube and for the stop washer 30 respectively. A suitably dimensioned shaft extension 82 is engaged to the shaft socket 46, the extension supporting, successively, stop washer 30, hard rubber washer 32, resilient sleeve 33, hard rubber washers 32', and nut 34.

This modification is most conveniently employed by properly spacing the copper tube end relative to the discontinued service pipe 58, and then threading the fitting 79 onto the pipe. The tool, with adapter 78 and shaft extension 82 assembled therewith, may then be properly positioned by threading the assembly onto fitting 79 until the tube end encounters shoulder 80. The expanding tool is then manipulated as in the previous examples, the expansion operation terminating with the various elements in the position shown in Figure 14. Upon turning the pawl handle or collar member to return the shaft and expanding elements to their original position, the expanding tool assembly may be backed off fitting 79 and removed from the expanded and beaded tube end. Subsequently, a fitting substantially conforming to adapter 78, at least internally, may be employed with fitting 79 to constitute a coupling and make a joint on the expanded tube end.

Figure 21:
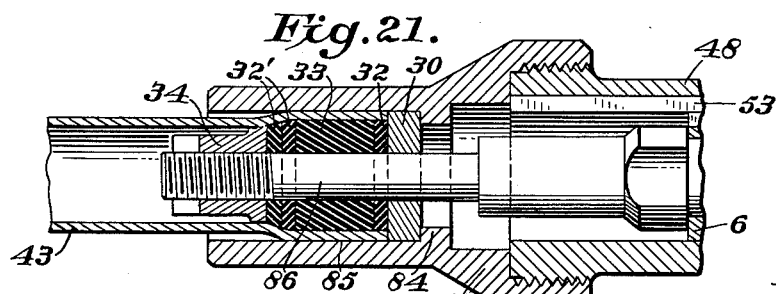
Figure 21 is a view corresponding to Figure 20, but showing the relationship of the parts at the end of the expanding operation.
Figures 22, 25:
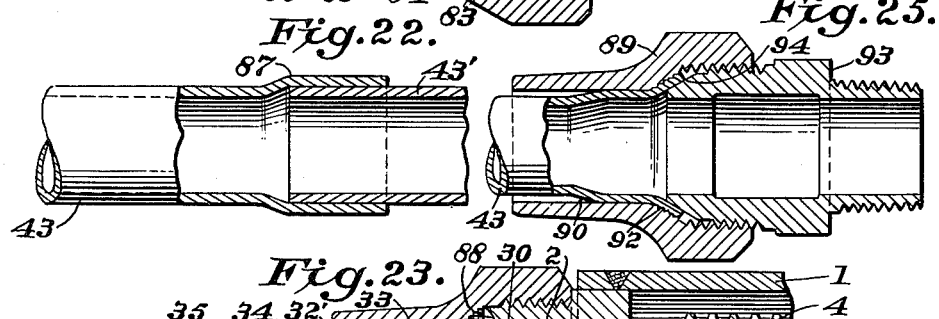
Figure 22 is a sectional view of a solder joint formed in the tube end expanded in Figures 20 and 21.
Figure 25 is a longitudinal sectional view of coupling structure assembled on the flared pipe end formed in Figures 23 and 24.

Another example of the versatility of the tool of Figures 5 and 6 is illustrated in Figures 20, 21 and 22, wherein the expansion of a tube end into socket form for formation of a solder joint is shown. For this purpose, a special adapter 83 is engaged to the sleeve member neck portion, the adapter comprising an internal flange 84, and inwardly thereof a straight bore 85. The diameter of bore 85 desirably exceeds the outer diameter of the copper tube by twice the tube wall thickness, whereby a tube end expanded therein into socket form will be adapted for reception thereinto of a tube end of substantially the original diameter of the tube. As shown, the shaft extension 86 employed in this embodiment carries a stop washer, abutting the adapter internal flange 84, and the usual expanding elements and retaining means therefor. With the tool assembled as described, a tube end may be inserted thereinto until it encounters the stop washer, as shown in Figure 20.

The expanding operation is carried out as described in connection with the previous examples, whereby the tube end is expanded into socket form against bore 85, the relationship of the elements at the end of the expanding operation being shown in Figure 21. The tool assembly being returned to original condition and withdrawn, the end of a tube 43', corresponding in size to the original dimensions of tube 43, may be inserted into the tube socket 87 formed by the expanding operation, and soldered thereinto to form the joint shown in Figure 22.

Figure 23:
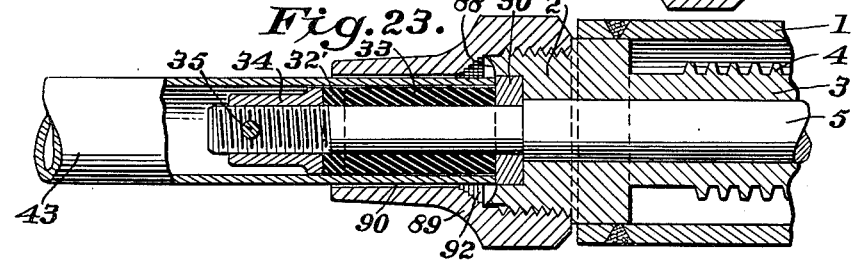
Figure 23 is a longitudinal sectional view of the inner end of the tool of Figure 1, modified and adapted to expand a pipe end into flared form.
Figure 24:
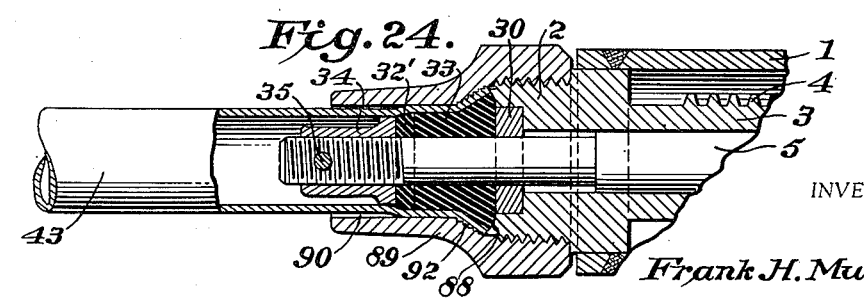
Figure 24 is a view corresponding to Figure 23, but showing the relationship of the parts at the end of the flaring operation.

Still another mode of employment of the pipe expanding device is illustrated in Figures 23, 24 and 25, wherein a tool corresponding generally to the embodiment of Figures 1 and 2 is employed, the tool, however, being modified at its inner end whereby the die section 2 is replaced by an annular curved section 88. The inner end of the tool sleeve member is externally threaded, and adapted thereby for engagement thereto of a flare fitting 89. Flare fitting 89 comprises a bore 90, of diameter slightly exceeding the outer diameter of the copper tube to be expanded and flared, and at the inner end of said bore the outwardly flaring serrated surface 92, which may be identical with the surface 26 of die section 2 of the embodiment of Figures 1 and 2, although oppositely disposed. In this modification, for reasons presently apparent, it is desirable to omit the hard rubber washer 32, the inner end portion 7 of shaft 5 bearing merely stop washer 30, resilient sleeve 33, hard rubber washer 32', and nut 34.

To expand and flare the tube end, the flare fitting may be engaged to the tool sleeve member, and the entire assembly passed over the end of the copper tube until stop washer 30 is encountered thereby. The expansion operation is carried out in the manner described in connection with the embodiment of Figures 1 and 2, the hard rubber washer 32' and the resilient sleeve 33 being compressed thereby and caused to expand outwardly, whereby the tube end is expanded into close-fitting relationship with the fitting bore, and the end portion of the tube is forced into the outwardly flaring form illustrated in Figure 24. The radius of surface 88 desirably corresponds to the radius of the tube end flare, as measured from its bending point at the junction of bore 90 and surface 92 to the tube end, whereby as the end portion of the tube is being forced outwardly into flare form, it maintains close contact with surface 88 and prevents the passage of the soft rubber of resilient sleeve 33 therebetween. It will be recognized that the entrance of rubber into the space between the tube flare and the serrated surface would be highly detrimental to the form of the final flare. Since fluid expansion to a considerable degree is required in this case immediately adjacent the stop washer, it will be evident that no hard rubber washer 32 is required at this point, and further that the presence of such a washer would be, in fact, somewhat detrimental to the expansion.

At the termination of the expanding and flaring operation, the tool may be returned to original position and removed from flare fitting 89, the flare fitting being ideally adapted for retention and employment as one of the fittings of the final coupling. The tube flare will thereby be formed into perfect complementary shape relative to the fitting serrated surface, and the tube portion adjacent the flare will fit closely and securely within the fitting bore. As shown in Figure 25, a complementary flare fitting 93 may be threaded into fitting 89, the fitting 93 comprising a conical surface 94 adapted to engage the inside of the tube end flare and compress the flare between the surfaces 94 and 92. The flared tube joint so achieved, it will be understood, possesses substantially all the advantages pointed out in connection with the bead coupling joint effected by the tool of Figures 1 and 2.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. A portable pipe expanding tool comprising: a sleeve member; a shaft member disposed therewithin for axial movement relative thereto; a collar; means connecting said collar to one of said members against relative axial movement and for relative rotation therebetween; interior threads on said collar engaged with complementary exterior threads on the other of said members for effecting axial movement of said shaft member by rotation of said collar relative to said other member; means on said sleeve member and said collar completely enclosing said exterior threads on said other member; a resilient expanding element on one end of said shaft member; and abutment means on said sleeve member for compression of one end of said expanding element thereagainst.

2. The structure defined in claim 1 including a reduced extension on the opposite end of the shaft member extending within a complementary aperture in the collar.

3. The structure defined in claim 1 including means associated with the sleeve member defining an outwardly flaring, annularly serrated die surface partially enclosing the expanding element.

4. The structure defined in claim 1 in which the thread enclosing means includes a section of said collar having smooth interior walls, one end of said section being of reduced interior diameter defining a central bore, and including a reduced extension on the opposite end of the shaft member extending snugly within said collar bore.

5. The structure defined in claim 1 in which the connecting means connects the collar to the sleeve member and the exterior threads are on the shaft member, and including indicating means on said shaft member disposed to indicate a predetermined relative displacement thereof by emergence from said collar.

6. The structure defined in claim 5 in which the connecting means connects the collar to the shaft member, the exterior threads are on the sleeve member, and said sleeve member has a portion spaced radially outwardly of said exterior threads and defining an annular recess therebetween for partial reception of said collar, and including indicating means on said collar disposed to indicate a predetermined relative displacement thereof by emergence from said sleeve portion.

References Cited in the file of this patent

UNITED STATES PATENTS

| | | |
|---|---|---|
| 1,610,796 | King | Dec. 14, 1926 |
| 1,753,005 | Grady | Apr. 1, 1930 |
| 2,068,021 | Hamman | Jan. 19, 1937 |
| 2,306,619 | Flachbarth | Dec. 29, 1942 |
| 2,310,639 | Johnson, Jr. | Feb. 9, 1943 |
| 2,405,399 | Bugg et al. | Aug. 6, 1946 |
| 2,417,202 | Hull et al. | Mar. 11, 1947 |
| 2,447,909 | Hunziker | Aug. 24, 1948 |
| 2,458,854 | Hull et al. | Jan. 11, 1949 |
| 2,520,162 | Morrison | Aug. 29, 1950 |

FOREIGN PATENTS

| | | |
|---|---|---|
| 535,304 | Great Britain | Apr. 4, 1941 |